July 22, 1969     K. L. JOHNSON     3,456,704
PREVAILING TORQUE LOCKNUT
Filed Nov. 13, 1967     2 Sheets-Sheet 1
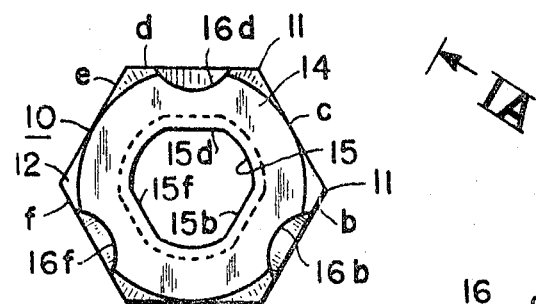
Fig. 1
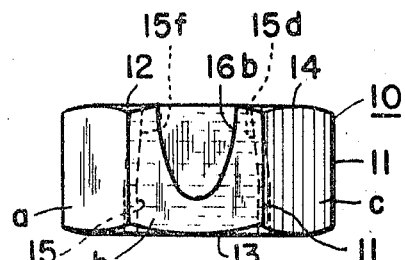
Fig. 1A
Fig. 1B
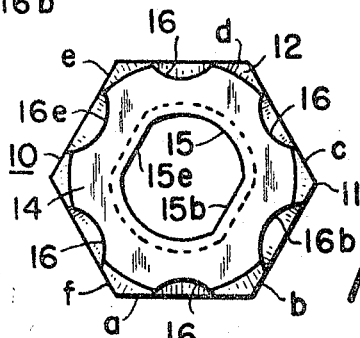
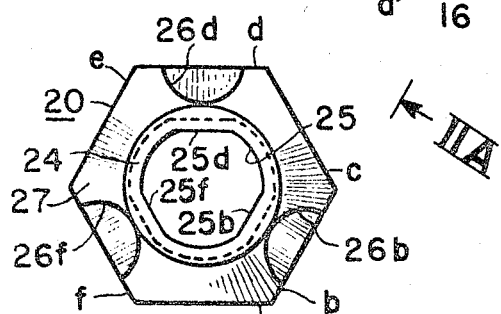
Fig. 2
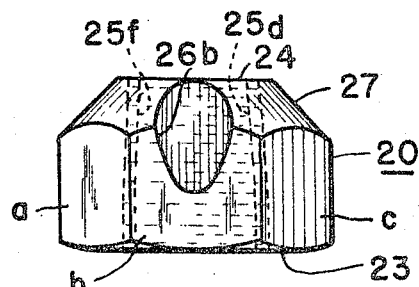
Fig. 2A
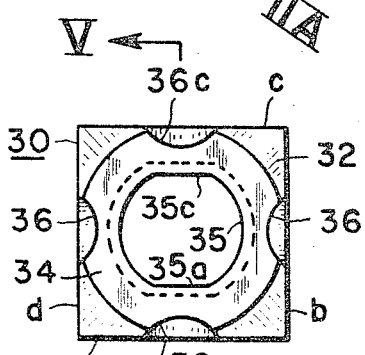
Fig. 3
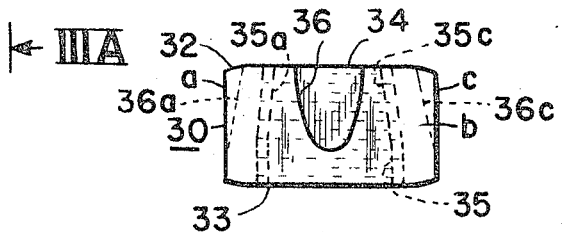
Fig. 3A
INVENTOR.
Kenneth L. Johnson
BY
Green, McCallister & Miller
HIS ATTORNEYS July 22, 1969      K. L. JOHNSON      3,456,704
PREVAILING TORQUE LOCKNUT Filed Nov. 13, 1967      2 Sheets-Sheet 2

INVENTOR.
Kenneth L. Johnson
BY
Green, McCallister & Miller
HIS ATTORNEYS though it has been illustrated as a hexagonal nut of more-or-less standard construction, it will be apparent that the invention may be applied to various forms of nuts.

United States Patent Office
3,456,704
Patented July 22, 1969

3,456,704
PREVAILING TORQUE LOCKNUT
Kenneth L. Johnson, Monroeville, Pa., assignor to Screw and Bolt Corporation of America, Pittsburgh, Pa., a corporation of Pennsylvania
Filed Nov. 13, 1967, Ser. No. 682,162
Int. Cl. F16b 39/28, 41/00; B21d 53/24
U.S. Cl. 151—21    3 Claims

ABSTRACT OF THE DISCLOSURE

A prevailing torque locknut is provided by forming a group or at least two fluted, hollow, concave, radial valley or groove portions of reduced section in the body of a nut blank that slope or taper downwardly-outwardly along its body; each flute or concave portion defines a cross-sectional wall of increased resiliency and of a thickness that is less than or reduced with respect to adjacent portions of the body. The flute or concave portions incline from a top end or face portion of the nut body, adjacent a central bore therein, substantially centrally between corner areas, along any intermediate area and into and centrally along vertical side faces to terminate on the side faces or wrench flat portions above and adjacent a bottom end face of the body. The flute or concave portions may be formed in the body of the nut blank after the forming of the central bore therethrough and prior to thread tapping thereof. Subsequently, axial, radial-inward crimping or inward deforming force is applied to provide a group or at least a pair of inwardly-distorted, locking thread portions adjacent the top end of the body. Although the invention has been devised to make practical the use of a conventional shape of nut, such as a heavy body square nut as a lock nut, the invention has been illustrated as also applied to nuts having a polygonal side face construction, to tapered crown nuts and to projection weld nuts.

---

The invention relates to prevailing torque locknuts and particularly, to devising and making prevailing torque locknuts of improved resiliency. A phase of the invention deals with providing a locknut with improved elasticity or resiliency, without weakening it, and without necessitating non-standard design changes or construction of it from the standpoint of its outer peripheral wrenching area.

In the prevailing torque locknut, the locking function is derived from deformation of a portion of its wall thickness through the agency of deformed portions of the threaded bore. The deforming of the bore may be accomplished by a radial inward force applied at right angles thereto or in an inclined angle axially-inwardly thereof. The majority of prevailing torque locknuts in present day usage have a tapered crown portion that is deformed-inwardly at spaced peripheral areas. The crown portion gives a reduced upper section that lends resiliency to the structure. The Skidmore U.S. Patent Nos. 3,208,494 and 2,966,082 and the Jonhson Patent No. 3,340,920 are representative of the art in this connection where the deforming force is exerted axially of the threaded bore.

U.S. Patents Nos. 3,311,146 and 3,171,459 to Storch and No. 3,198,230 to Stover represent nuts in which the deformation force is applied directly, radially-inwardly of their peripheries. Engstrom U.S. Patent Nos. 2,976,879 and 2,580,745 show a plurality of inwardly extending tangs that are formed by shearing of the nut wall for the purpose of providing resiliency. This, of course, necessitates an expensive type of nut and one whose strength is weakened by shearing portions of its body.

Rupf U.S. Patent No. 3,193,921 shows a locknut in which a die is employed to deform wall portions inwardly to produce wavy or rolled-over deformed web portions. Since there is no reduced section through the deformed area, the nut has insufficient resiliency to meet requirements in this respect. Dwyer U.S. Patent No. 3,277,942 is similar to Rupf, but he recognizes the lack of resilience that is inherent in such a structure and thus limits its applicability to a small size thin-wall nut form.

Previous to the present invention no one has been able to provide a prevailing torque nut from a so-called standard square nut blank because of its more or less heavy rigid structure.

It has thus been an object of the invention to provide a new approach to a locknut construction such that the field of application of a prevailing torque locknut may be extended to various standard forms of nuts including a square nut and a square projection welding nut.

Another object of the invention has been to devise a nut construction and procedure for making it which will be relatively simple and inexpensive but highly practical and which will provide a locking nut of improved resiliency or elasticity.

A further object of the invention has been to make practical the utilization of nuts having standard wrench flat dimensions or constructions in providing a prevailing torque locknut.

A still further object of the invention has been to provide an improved resiliency or elasticity in a torgue locknut without substantially reducing the strength characteristics of its body as compared to the strength characteristics of a conventional nut of the same general construction.

These and other objects of the invention will appear to those skilled in the art from the illustrated embodiments, the description and the claims.

In the drawings:

FIGURE 1 is a top plan view of a hexagonally-shaped locknut embodying features of the invention and FIGURE 1A is a side view in elevation of the same nut and on the same scale and taken along the line I–A—I-A of FIGURE 1.

FIGURE 1B is a top plan view on the same scale as FIGURE 1 and illustrating a modified embodiment of the invention as also applied to a hexagonal-shaped nut body.

FIGURE 2 is a top plan view on the scale of FIGURE 1 showing the invention as applied to a nut body having a tapered or cone-shaped crown portion and FIGURE 2A is a side view in elevation on the same scale as and taken along the line II–A—II-A of FIGURE 2.

FIGURE 3 is a top plan view on the scale of FIGURES 1 and 2 illustrating an important application of the invention to a square type of nut body and FIGURE 3A is a side view in elevation on the same scale as and taken along the line III–A—III-A of FIGURE 3.

Figures 5, 6:
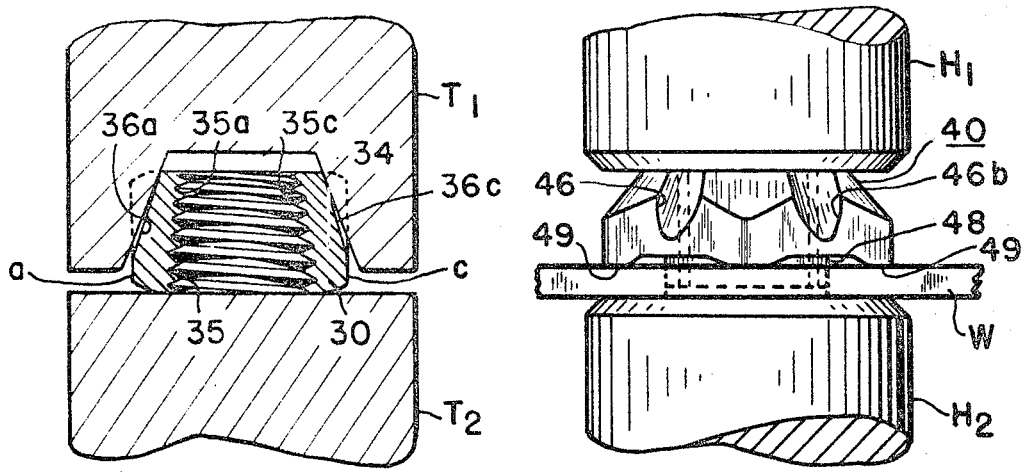

FIGURE 5 is a somewhat diagrammatic vertical section in elevation showing a tool arrangement for crimping or deforming peripherally spaced-apart wall portions of a nut body and associated threaded portions to provide latching or locking portions adjacent the upper end of the threaded bore; this view is on the same scale as and is taken along the line V—V of FIGURE 3 from the standpoint of the nut body there disclosed.

Figures 4, 4A:
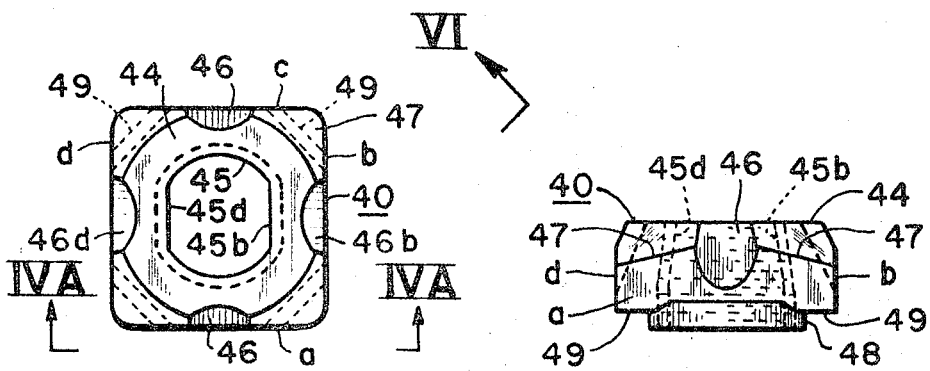
FIGURE 4 is a top plan view on the scale of FIGURES 1, 2 and 3 illustrating an important application of the invention to a projection weld nut having a pilot collar
FIGURE 4A is a side view in elevation on the same scale as and on line IV–A—IV-A of FIGURE 4.

FIGURE 6 is a side view in elevation of the nut body of and on the scale of and taken along line VI—VI of FIGURE 4; this view is illustrative of a welding tool or head set-up for projection welding a nut body, such as illustrated in FIGURES 4 and 4A, to a workpiece.

In carrying out the invention, a nut blank may be plastically deformed in an outwardly-declining manner from its top end face into and along its opposed side faces to form elongated valleys, hollow, groove, concave or flute portions of reduced section or lesser thickness than adjacent wall portions. These flute portions represent wall areas of minimum thickness of the overall body construction of the nut and are so constructed and located as to provide maximum elasticity or resiliency to the nut body while substantially retaining its full strength. The forming of peripherally spaced areas of lessened thickness is, as an optimum, accomplished by plastically deforming the body of the nut which inherently assures a full and complete filling out of the corners of the nut. The flute portions will be formed to extend centrally from the top or end face of the nut body along portions of minor thickness of the nut, as represented by side faces or wrench flat portions of the nut, centrally between joining corner areas thereof. After threads have been formed in a central bore of the nut body, symmetrically spaced-apart locking portions may be formed in the thread wall adjacent the top end of the nut by applying inward deforming force simultaneously to opposed wall portions and adjacent the top end or the face of the nut.

In the various embodiments, the same general principles of invention are employed in accordance with which peripherally or circumferentially-spaced wall portions of a nut blank or body are provided with axially-extending and upwardly-inwardly, or downwardly-outwardly sloped, flute or concave portions of reduced or lessened thickness or section along intermediate portions of the wall of the nut blank. The slope of such portions of reduced section or thickness may be varied to suit the type of nut and, in this connection, may define an included angle of about 30° for a thin-wall hexagonal nut to about 90° for a square or thick-wall nut body.

After the nut body has been tapped, it is subjected to radial-inward deformation, as by a tool $T_1$ of FIGURE 5 that has a hollow or fork-shaped construction and whose tines or prongs each define a downwardly-outwardly inclined included angle that is slightly greater than the included angle of the pair of opposed fluted portions, such as 36 of the nut 30 of FIGURES 3 and 3A, to which it is to be applied. For example, if the included angle of a concave portion 36 of the nut body is 60°, the included angle of tines of $T_1$ may be about 66° to 68°. This is illustrated in FIGURE 5, in that the outwardly declining inner faces of the tines or prongs of the tool $T_1$ are shown in engagement with uppermost portions of a pair of opposed flute portions so as to deform the threaded bore 35 at opposite areas 35a and 35c and provide shaped fluted portions, represented by 36a and 36c. The dotted lines in FIGURE 5 show the original shape of the nut body 30 before its sides are deformed to provide a pair of opposed flute portions, while the full lines show the shape of the nut as completed from the standpoint of crimping-in forming locking thread portions 35a and 35c and deformed flute portions 36a and 36c. In FIGURE 5, the lower tool $T_2$ serves as a support for the nut body 30 during the operation that is accomplished by the fork-like downwardly-axially moving tool $T_1$.

In all embodiments illustrated in the drawings, letters a through f represent planar, vertical, side faces of the nut bodies which define the outer periphery thereof and provide wrench flat portions for receiving a standard wrench. Also, in the various embodiments, the same second numeral portion is used for similar parts of the various embodiments. For example, 15 represents the threaded bore nut 10 of FIGURES 1 to 1B, while 25 represents the threaded bore of nut 20 of FIGURES 2 and 2A, 35 represents the threaded bore of nut 30 of FIGURES 3 and 3A, and 45 represents the threaded bore of nut 40 of FIGURES 4 and 4A.

Referring particularly to FIGURES 1 and 1A, nut 10 is shown as a finished nut and as having side faces a, b, c, d, e and f defining a hexagonal outer periphery thereabout, connected about its body by side corner areas 11, and connected vertically-downwardly to a planar bottom face 13 and vertically-upwardly to a planar top end face 14 by beveled portions 12. Threaded bore 15 extends centrally through the body of the nut 10 and is open to its bottom and top faces 13 and 14, and is radially-inwardly distorted at circumferentially or peripherally spaced areas as shown in FIGURE 1 to provide latching or locking thread portions 15b, 15d and 15f. In this embodiment, all the fluted portions of lessened section or thickness have been crimped, as represented by 16b, 16d and 16f, by the application of a three-pronged fork-like tool, such as somewhat diagrammatically illustrated in FIGURE 5. In the embodiment of FIGURE 1B, only a pair of opposed portions 16b and 16e have been distorted inwardly to provide latching or locking thread portions 15b and 15e; other fluted portions of minimum thickness 16 are retained in their original shape. The use of flute or concave portions on all wrench flat sides of the nut in FIGURE 1B gives optimum results from the standpoint of resiliency or elasticity with respect to the latching portions 15b and 15e.

In the embodiment of FIGURES 2 and 2A, the nut body 20 is shown provided with three spaced-apart crimped-in latching thread areas 25b, 25d and 25f, see also the embodiment of FIGURES 1 and 1A. However, the nut 20 is additionally shown as provided with a cone-shaped upper crown portion 27 which increases the resiliency of the construction and thus makes possible a shorter length of the flute portions, such as 26b of FIGURE 2A and as compared to the length 16b of flute portion of FIGURE 1A.

FIGURES 3 and 3A illustrate an important application of the invention to a standard square nut which is believed to make practical for the first time a prevailing torque locknut employing a nut body of somewhat standard heavy shape. The nut body 30 is provided with fluted portions 36, two of which 36a and 36c, have been crimped to provide opposed locking thread portions 35a and 35c.

In the embodiment of FIGURES 4 and 4A, the invention is applied to a projection weld nut 40 that is shown of square periphery and as having a cone-shaped upper portion 47 and flute portions 46 along each of its side faces with two of them 46b and 46d being crimped to provide locking thread portions 45b and 45d. The nut body 40 additionally is provided with weld projections 49 on its bottom face adjacent each of its corners, see particularly FIGURES 4 and 6. It also is shown provided with an annular or ring-shaped locating collar 48 that extends downwardly from its bottom face to define a continuation of its threaded bore 45.

FIGURE 6 illustrates a welding operation as accomplished using the nut 40. It will be noted that upper welding head $H_1$ contacts the flat top end face 44 to press the nut body downwardly to cause flow of electric current through its welding projections 39 and the melting and welding of such portions to a workpiece, such as W, which is supported on a lower welding head $H_2$. As shown, the locating collar 48 extends down through a hole in the workpiece W to accurately align the nut 40 during the welding operation and to strengthen it in its mounted relation on the workpiece W.

In accordance with the disclosed invention, a nut body is provided which has a top planar face portion, such as 44 of FIGURE 4, to assure a good intimate electrical engagement and contact with a welding head $H_1$. It has been determined that forming of the flute portions, such as 16, by plastically deforming the wall of the nut body to reduce its thickness in an inclined vertical plane, not only contributes to a better nut body by assuring the full filling of the corners of the nut, but also substantially retains the strength of the body at the thickness reduced localized areas while, at the same time, provides the body wall with an excellent resiliency or elasticity required for a locknut utilization. In other words, the resiliency is provided without weakening the nut and, in such a manner, that a substantially standard size or shape of nut may be provided to enable the use of a standard wrench.

Although the flute portions as formed are ideal for coincident crimp-deforming or shaping the latching thread portions of a nut, it will be apparent that, if desired, the latching thread portions may be deformed or provided by applying inward-deforming force adjacent the corners of the nut body. The portions of minimum section or wall thickness, as represented by the flutes 16, 26, 36 or 46, will provide areas of maximum resiliency of elasticity, either between deformed latching thread areas or immediately at deformed latching thread areas, as may be desired. Locknuts made in accordance with the principles of the invention, under test, display excellent resilience, as evidenced by their ability to withstand re-application to a mating bolt as many as ten times with a retention of some 200% of the minimum prevailing torque that is stipulated in specifications for prevailing torque locknuts.

Although specific embodiments of the invention have been shown and described for the purpose of illustrating it and representative procedure has been outlined, it will be apparent to those skilled in the art that various modifications, additions and changes may be made with respect to the illustrated embodiments and the procedure outlined.

I claim:

1. In a prevailing torque locknut of improved locking resiliency having a solid metal body provided by vertical substantially planar side faces and vertical corner areas between said side faces that together define wrench flat portions of polygonal periphery of a size and shape to receive a standard wrench, said body having a lower end provided with a substantially planar bottom face connected to and directly terminating perpendicular to and at said planar side faces, said body having a crown type of upper end provided by a radially-centered substantially planar top face and a frustoconical upper face connecting said planar top face to said planar side faces, a threaded bore extending vertically-centrally-axially along the body between and open through said planar top and bottom faces, said top face surmounting the upper end of the body and being continuous about the threaded bore and isolating said frusto-conical upper face from the threaded bore, said frusto-conical upper face having an included angle within a range of about 30° and 90° and upwardly-radially-inwardly converging into said planar top face, at least a pair of plastically-deformed flute portions; each of said flute portions extending from said top face radially-downwardly therefrom, fully along said frusto-conical upper face and centrally into and along an adjacent planar side face and terminating on and at a position at least midway of the vertical extent of said adjacent side face, said body having a thiner thickness along said pair of flute portions than along adjacent portions thereof to define areas of increased resiliency between said vertical corner areas, at least a pair of opposed locking thread portions extending from the said planar top face along the threaded bore in alignment and said fluted portions and having a radially-inwardly crimped relation with respect to other portions of the threaded bore.

2. In a prevailing torque locknut as defined in claim 1, said planar side faces defining at least four corner areas about said body of the nut, and weld projections extending downwardly from said bottom face adjacent said corners for securing said body to a metal workpiece.

3. In a prevailing torque locknut as defined in claim 2, an annular locating collar extending downwardly from said bottom face about the threaded bore and defining an open-end extension of the threaded bore, and said locating collar being adapted to fit within a hole in the workpiece for aligning the nut in position when it is being welded to the workpiece.

References Cited

UNITED STATES PATENTS

| 2,068,613 | 1/1937 | Stoll. |
| 2,440,944 | 5/1948 | Green. |
| 2,709,469 | 5/1955 | Tripp et al. |
| 2,796,107 | 6/1957 | Schwaiger. |
| 2,931,410 | 4/1960 | Stoll. |
| 3,140,738 | 7/1964 | Johnson. |
| 3,208,494 | 9/1965 | Skidmore. |
| 3,277,942 | 10/1966 | Dwyer. |

FOREIGN PATENTS

| 12,174 | 9/1887 | Great Britain. |
| 789,395 | 1/1958 | Great Britain. |

MARION PARSONS, JR., Primary Examiner

U.S. Cl. X.R.

10—86; 151—41.7